(12) United States Patent
Bullough et al.

(10) Patent No.: US 10,623,544 B1
(45) Date of Patent: *Apr. 14, 2020

(54) ELECTRONIC DEVICE INCLUDING A DIRECTIONAL MICROPHONE

(71) Applicant: Sorenson IP Holdings, LLC, Salt Lake City, UT (US)

(72) Inventors: Jeffrey Charles Bullough, South Jordan, UT (US); D. Mark Parry, Salt Lake City, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/485,685

(22) Filed: Apr. 12, 2017

Related U.S. Application Data

(63) Continuation of application No. 15/260,831, filed on Sep. 9, 2016, now Pat. No. 9,628,596.

(51) Int. Cl.
| | |
|---|---|
| *H04M 1/19* | (2006.01) |
| *H04M 1/03* | (2006.01) |
| *H04M 1/20* | (2006.01) |
| *H04M 1/62* | (2006.01) |
| *H04R 1/34* | (2006.01) |
| *H04R 1/02* | (2006.01) |
| *H04R 1/28* | (2006.01) |

(52) U.S. Cl.
CPC ............... *H04M 1/19* (2013.01); *H04M 1/03* (2013.01); *H04M 1/20* (2013.01); *H04M 1/62* (2013.01); *H04R 1/028* (2013.01); *H04R 1/2876* (2013.01); *H04R 1/342* (2013.01)

(58) Field of Classification Search
CPC ...... H04M 1/03; H04M 1/6033; H04R 1/028; H04R 1/04; H04R 1/2876; H04R 1/342
See application file for complete search history.

(56) References Cited

U.S. PATENT DOCUMENTS

| | | |
|---|---|---|
| 4,777,469 A | 10/1988 | Engelke et al. |
| 4,959,847 A | 9/1990 | Engelke et al. |
| 5,081,673 A | 1/1992 | Engelke et al. |
| 5,121,426 A | 6/1992 | Baumhauer, Jr. et al. |
| 5,216,711 A | 6/1993 | Takagi et al. |
| 5,226,076 A | 7/1993 | Baumhauer, Jr. et al. |
| 5,325,417 A | 6/1994 | Engelke et al. |

(Continued)

FOREIGN PATENT DOCUMENTS

| | | |
|---|---|---|
| CA | 2174798 A1 | 12/1996 |
| CN | 1655566 A | 8/2005 |

(Continued)

*Primary Examiner* — Tuan D Nguyen
(74) *Attorney, Agent, or Firm* — Maschoff Brennan

(57) ABSTRACT

An electronic device may include a housing and a directional microphone. The housing may include a front surface, a rear surface positioned opposite the front surface, and a hollow cavity positioned between the front surface and the rear surface. The hollow cavity may include a front opening defined in the front surface and a rear opening defined in the rear surface. The directional microphone may include a front port and a rear port. The directional microphone may be mounted in the hollow cavity of the housing with the front port oriented toward the front opening and with the rear port oriented toward the rear opening.

20 Claims, 12 Drawing Sheets

(56) References Cited

U.S. PATENT DOCUMENTS

| | | |
|---|---|---|
| 5,327,479 A | 7/1994 | Engelke et al. |
| 5,341,420 A | 8/1994 | Hollier et al. |
| 5,343,523 A | 8/1994 | Bartlett et al. |
| 5,351,288 A | 9/1994 | Engelke et al. |
| 5,432,837 A | 7/1995 | Engelke et al. |
| D364,865 S | 12/1995 | Engelke et al. |
| 5,581,593 A | 12/1996 | Engelke et al. |
| 5,604,786 A | 2/1997 | Engelke et al. |
| 5,687,222 A | 11/1997 | McLaughlin et al. |
| 5,724,405 A | 3/1998 | Engelke et al. |
| 5,809,425 A | 9/1998 | Colwell et al. |
| 5,909,482 A | 6/1999 | Engelke |
| 5,974,116 A | 10/1999 | Engelke et al. |
| 5,978,654 A | 11/1999 | Colwell et al. |
| 6,075,842 A | 6/2000 | Engelke et al. |
| 6,108,415 A | 8/2000 | Andrea |
| 6,421,444 B1 | 7/2002 | Van Schyndel |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,594,346 B2 | 7/2003 | Engelke |
| 6,603,835 B2 | 8/2003 | Engelke et al. |
| 6,882,707 B2 | 4/2005 | Engelke et al. |
| 6,885,731 B2 | 4/2005 | Engelke et al. |
| 7,058,184 B1 | 6/2006 | Hickling |
| 7,298,859 B1 | 11/2007 | Worley et al. |
| 7,660,398 B2 | 2/2010 | Engelke et al. |
| 7,881,441 B2 | 2/2011 | Engelke et al. |
| 9,350,857 B1 | 5/2016 | Engelke et al. |
| 2003/0168278 A1 | 9/2003 | Solderits |
| 2004/0258267 A1 | 12/2004 | Christensen et al. |
| 2007/0237338 A1 | 10/2007 | Konchitsky |
| 2007/0263845 A1 | 11/2007 | Hodges et al. |
| 2009/0161900 A1 | 6/2009 | Enstad et al. |
| 2014/0247954 A1 | 9/2014 | Hall et al. |
| 2015/0078555 A1 | 3/2015 | Zhang et al. |
| 2015/0163588 A1* | 6/2015 | Johansen ............... H04R 1/326 381/92 |
| 2015/0323456 A1 | 11/2015 | Agashe et al. |
| 2016/0007125 A1 | 1/2016 | Lee et al. |
| 2016/0142814 A1 | 5/2016 | deRoo |
| 2017/0034617 A1* | 2/2017 | Smith ..................... H04R 1/08 |

FOREIGN PATENT DOCUMENTS

| | | |
|---|---|---|
| DE | 19533001 C1 | 1/1997 |
| EP | 0827360 A2 | 3/1998 |
| GB | 2388787 A * | 11/2003 |

* cited by examiner

US 10,623,544 B1

ELECTRONIC DEVICE INCLUDING A DIRECTIONAL MICROPHONE

CROSS-REFERENCE TO RELATED APPLICATION

This application is a continuation of U.S. patent application Ser. No. 15/260,831, filed on Sep. 9, 2016, and issued as U.S. Pat. No. 9,628,596 on Apr. 18, 2017, which is incorporated herein by reference in its entirety.

FIELD

The embodiments discussed herein are related to an electronic device including a directional microphone.

BACKGROUND

A telephone generally includes a speaker and a microphone. A telephone conversation between two users generally involves the first user speaking into the first telephone's microphone and the second user listening to the first user's spoken words on the second telephone's speaker, and vice versa.

Two common problems that can adversely affect the capacity of two users to understand a telephone conversation are background noise and acoustic echo. Background noise can be any component of the audio coming from either telephone's speaker that is not part of the conversation. This may include music playing in the background, people talking, traffic noise, or any other audio that can enter either telephone's microphone and partially or completely mask the desired conversation. Acoustic echo occurs when the audio from a telephone's speaker enters the telephone's microphone and is amplified and replayed through the speaker. This causes a positive feedback loop, which may be manifested as a screeching tone or whistle and which may partially or completely mask the desired conversation. Background noise and acoustic echo can therefore make it difficult for telephone users to understand a telephone conversation.

The subject matter claimed herein is not limited to embodiments that solve any disadvantages or that operate only in environments such as those described above. Rather, this background is only provided to illustrate one example technology area where some embodiments described herein may be practiced.

SUMMARY

An electronic device may include a housing and a directional microphone. The housing may include a front surface, a rear surface positioned opposite the front surface, and a hollow cavity positioned between the front surface and the rear surface. The hollow cavity may include a front opening defined in the front surface and a rear opening defined in the rear surface. The directional microphone may include a front port and a rear port. The directional microphone may be mounted in the hollow cavity of the housing with the front port oriented toward the front opening and with the rear port oriented toward the rear opening.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to a directional microphone in an electronic device. In at least some embodiments, the directional microphone may be configured to reduce or eliminate background noise and acoustic echo during a communication session, such as a telephone conversation, a video call, a voice-over-internet-protocol call, or other communication session, thereby making it easier for users to understand the communication session.

Figure 1A:
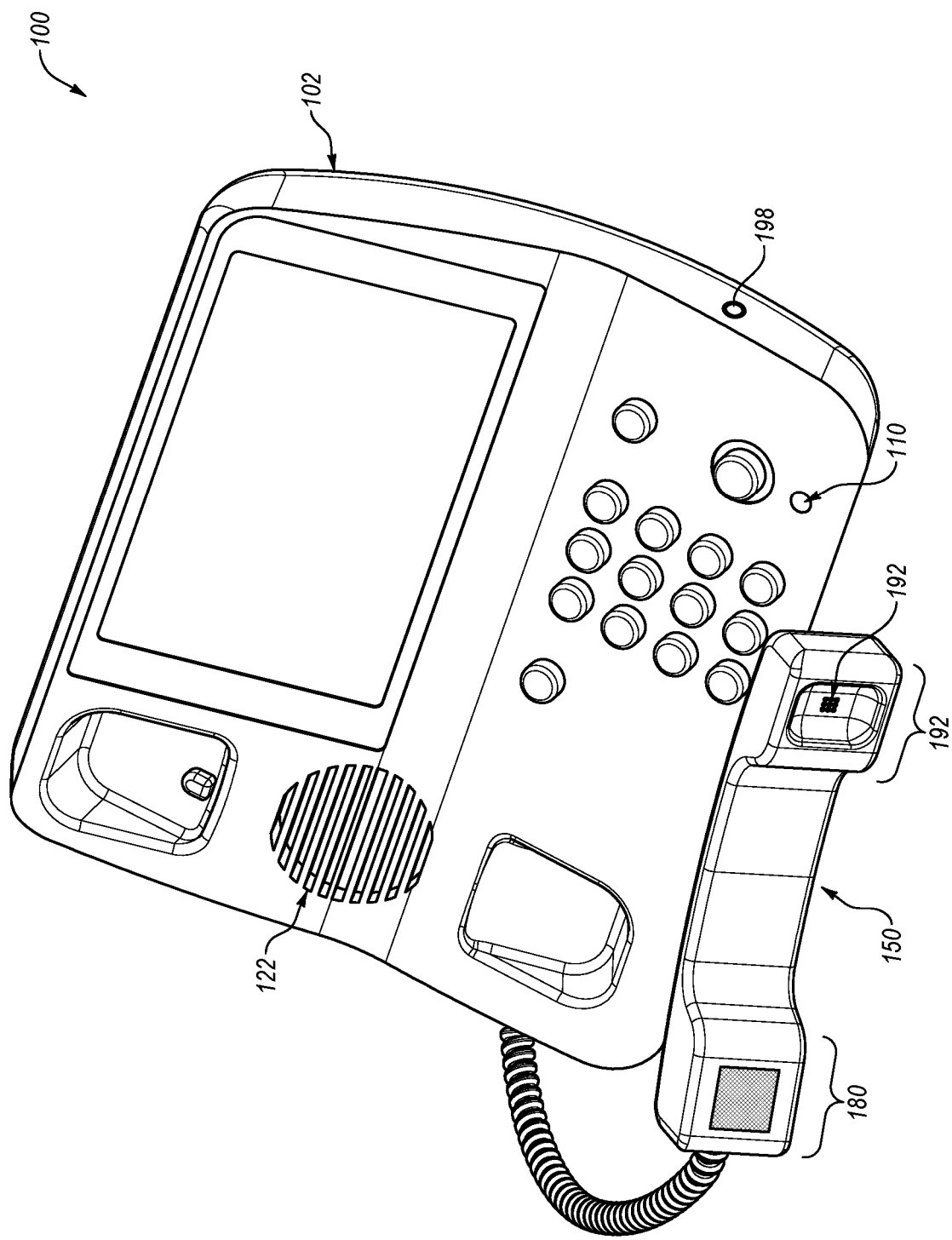
FIG. 1A illustrates a perspective view of an example telephone having an example base and a first example handset.

Turning to the figures, FIG. 1A illustrates a perspective view of an example telephone 100 having an example base 102 and an example handset 150. Each of the telephone 100, the base 102, and the handset 150 may be an electronic device arranged in accordance with at least one embodiment described in the present disclosure. Although the telephone 100 is a specialized captioning telephone, it is understood that other types of specialized and standard telephones may benefit from the various directional microphones configurations disclosed herein. Furthermore, other electronic devices that may enable a user to participate in a communication session may also benefit from the various directional microphones configurations disclosed herein. For example, the electronic devices may include cellphones, smartphone, tablets, and portable electronic devices, among other electronic devices.

The base 102 of the telephone 100 may be employed independently of the handset 150 or may be employed in connection with the handset 150. For example, a user of the telephone 100 may participate in a telephone conversation or other communication session using the base 102 and the handset 150 or instead only using the base 102 as a speakerphone.

Figure 1B:
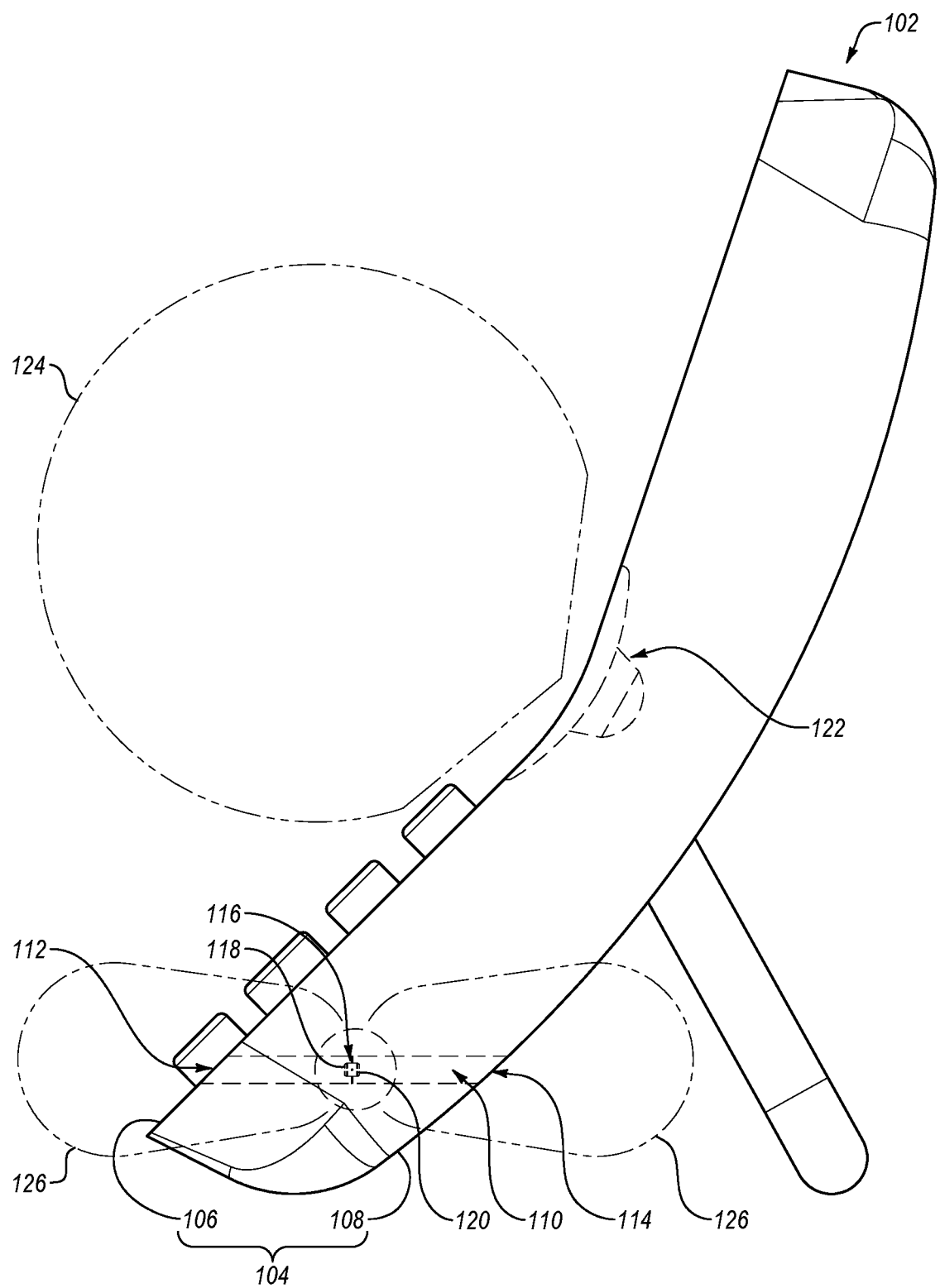
FIG. 1B illustrates a side view of the example base of FIG. 1A.
Figure 1C:
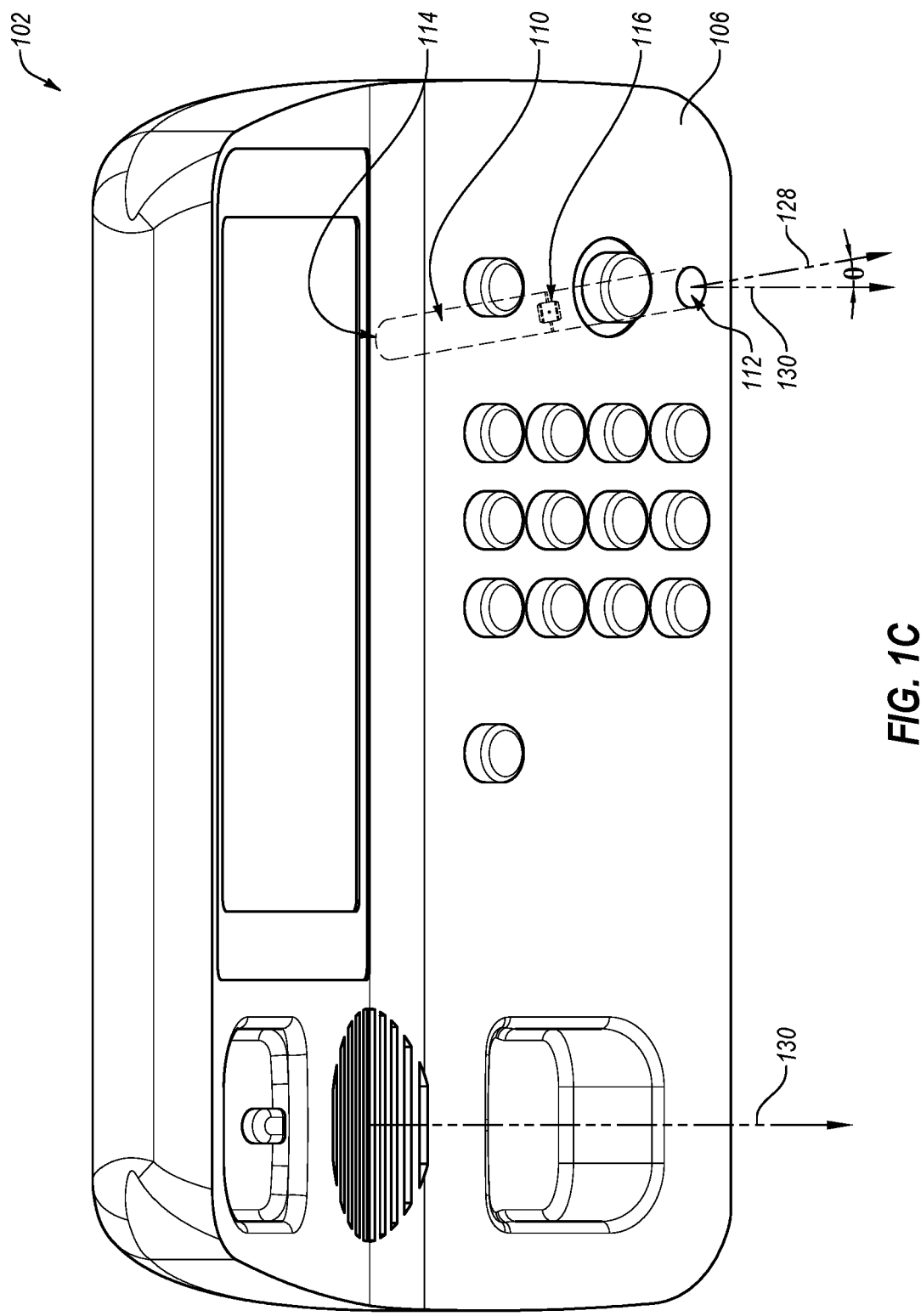
FIG. 1C illustrates a top view of the example base of FIG. 1A.

FIG. 1B illustrates a side view of the base 102 of the telephone 100 of FIG. 1A. FIG. 1C illustrates a top view of the base 102 of the telephone 100 of FIG. 1A. As disclosed in FIGS. 1B and 1C, the base 102 may include a housing 104 that includes a front surface 106 and a rear surface 108 positioned opposite the front surface 106. The housing may be formed from molded plastic, for example.

In some embodiments, the base 102 may include a hollow cavity 110 positioned between the front surface 106 and the rear surface 108. The hollow cavity 110 may include a front opening 112 defined in the front surface 106 and a rear opening 114 defined in the rear surface 108. In some embodiments, the hollow cavity 110 may be a cylindrical hollow cavity. In other embodiments, the hollow cavity 110 may have other shapes such as rectangular, oval, pentagonal, and hexagonal, among other shapes. In some embodiments, the front opening 112 and the rear opening 114 may have the same size and shape. In other embodiments, the front opening 112 and the rear opening 114 may have different sizes and/or different shapes.

Also disclosed in FIGS. 1B and 1C, the base 102 may further include a directional microphone 116 mounted in the hollow cavity 110. The directional microphone 116 may include a front port 118 and a rear port 120. The directional microphone 116 may be mounted in the hollow cavity 110 of the housing 104 with the front port 118 oriented toward the front opening 112 and with the rear port 120 oriented toward the rear opening 114. The front opening 112 and the rear opening 114 may allow acoustic waves to enter the hollow cavity 110 in order to enter the front port 118 and the rear port 120, respectively, of the directional microphone 116.

However, as disclosed in FIGS. 1B and 1C, the hollow cavity 110 and the directional microphone 116 may be configured to reduce or eliminate acoustic echo during a telephone conversation or other type of communication session. For example, in addition to the directional microphone 116, the base 102 may include a speaker 122 at least partially mounted in the housing 104. In some embodiments, as disclosed in FIG. 1B, the speaker 122 may be mounted in a position in the housing 104 of the base 102 such that a sound radiation field 124 of the speaker 122 is offset from a microphone sensitivity field 126 of the directional microphone 116, which places the speaker 122 in a null of the directional microphone 116. Further, in these and other embodiments, as disclosed in FIG. 1C, the hollow cavity 110 may be oriented in a direction 128 that is offset by an angle θ from an acoustic radiation direction 130 of the speaker 122. For example, the angle θ may be between 10 degrees and 50 degrees. In another example, the angle θ may be between 20 degrees and 40 degrees. In yet another example, the angle θ may be 30 degrees. Either or both of these offsets may reduce or eliminate acoustic waves emanating from the speaker 122 from entering either port of the directional microphone 116 and thereby reduce or eliminate acoustic echo. Further, the bi-directional configuration of the hollow cavity 110 and the directional microphone 116, in which the directional microphone 116 is only sensitive to acoustic waves from two opposing angles of arrival of acoustic waves and has a null in all other angles of arrival of acoustic waves, may reduce or eliminate background noise during a telephone conversation or other communication session as compared to an omnidirectional configuration in which a microphone has the same level of sensitivity from all angles of arrival of acoustic waves, for example.

Figure 1D:
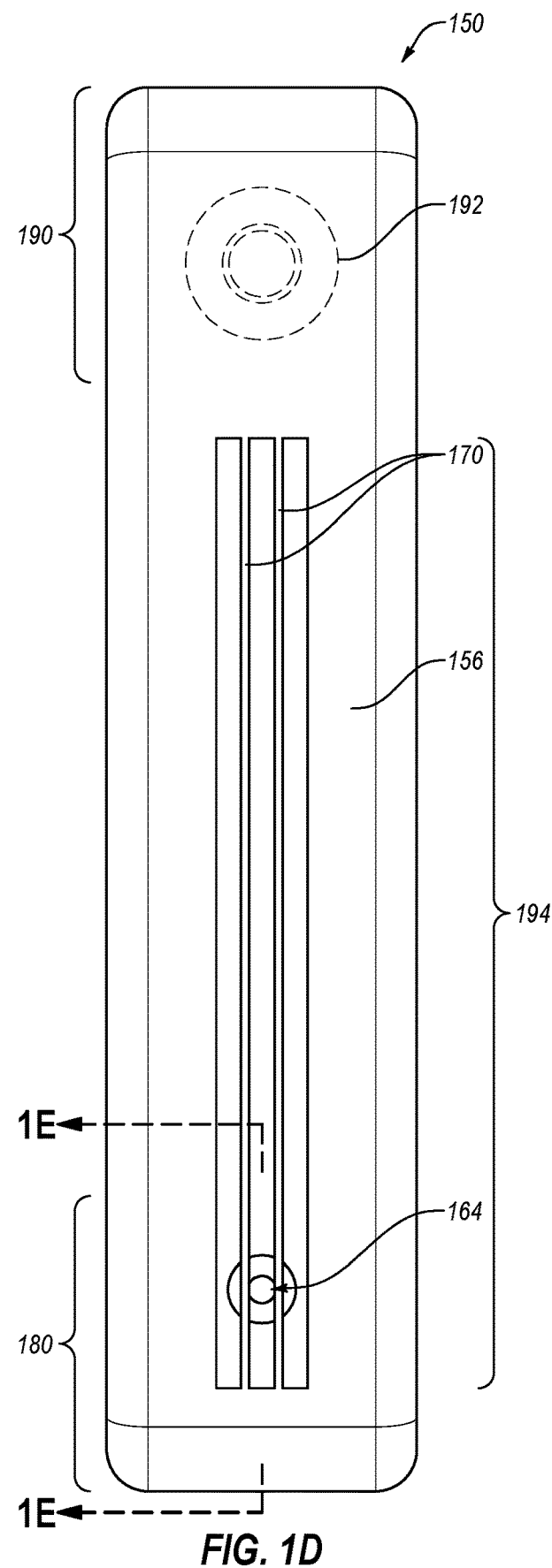
FIG. 1D illustrates a rear view of the first example handset of FIG. 1A.

FIG. 1D illustrates a rear view of the handset 150 of FIG. 1. FIG. 1E illustrates a cross-sectional side view of a microphone region 180 of the handset 150 of FIG. 1D. As disclosed in FIGS. 1D and 1E, the handset 150 may include a housing 152 that includes a front surface 154 and a rear surface 156 positioned opposite the front surface 154. The housing 152 may be formed from molded plastic, for example.

In some embodiments, the handset 150 may further include a hollow cavity 158 positioned between the front surface 154 and the rear surface 156. The hollow cavity 158 may include a front opening 160 defined in the front surface 154 and a rear opening 162 defined in the rear surface 156. A directional microphone 164 may be mounted in the hollow cavity 158. The directional microphone 164 may include a front port 166 and a rear port 168. The directional microphone 164 may be mounted in the hollow cavity 158 of the housing 152 with the front port 166 oriented toward the front opening 160 and with the rear port 168 oriented toward the rear opening 162. The front opening 160 and the rear opening 162 may allow acoustic waves to enter the hollow cavity 158 in order to enter the front port 166 and the rear port 168, respectively, of the directional microphone 164.

Figure 1E:
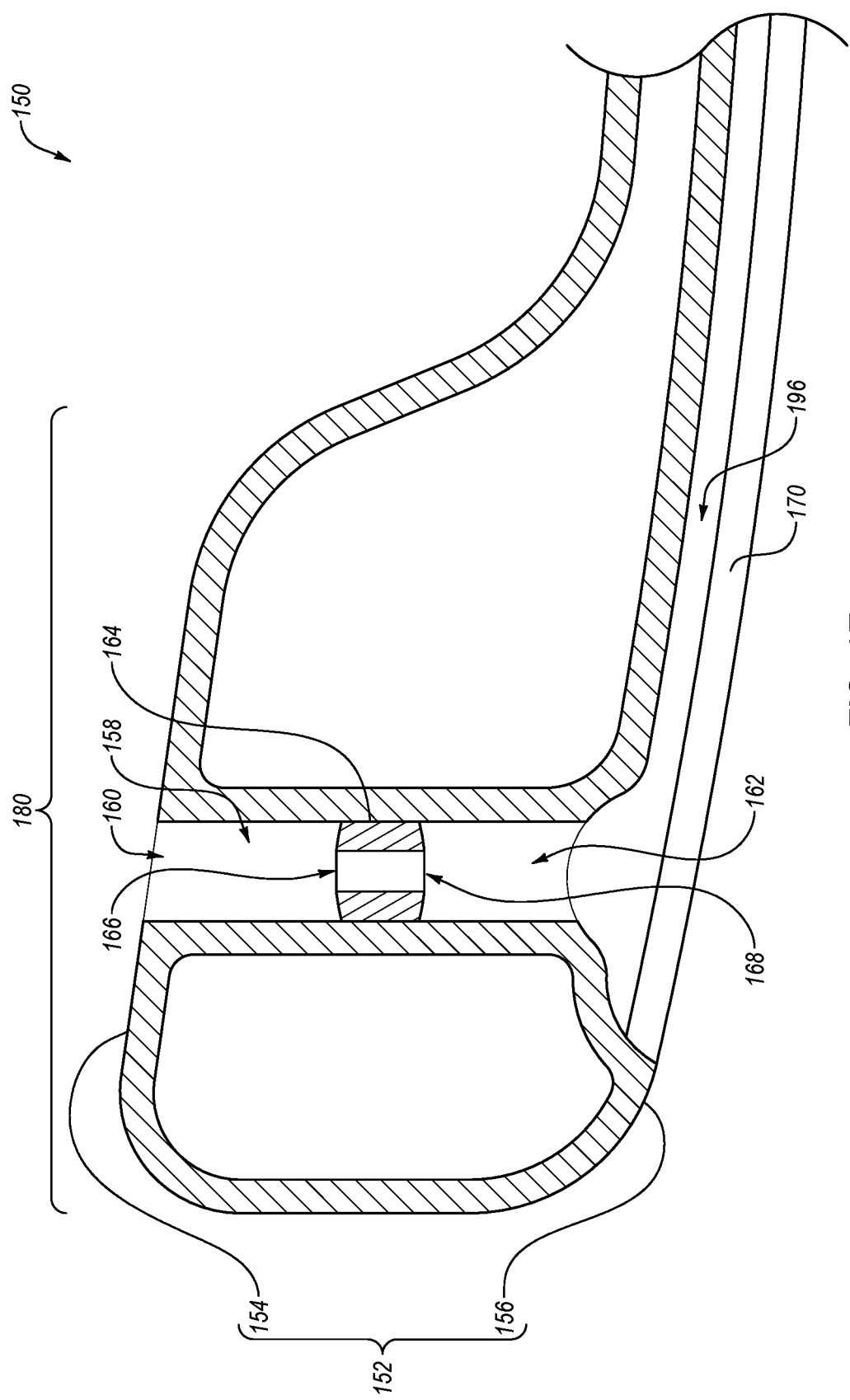
FIG. 1E illustrates a cross-sectional side view of a microphone region of the first example handset of FIG. 1D.

As disclosed in FIGS. 1D and 1E, the handset 150 may be configured to reduce or eliminate acoustic echo during a telephone conversation or other communication session. For example, in addition to the microphone region 180, the handset 150 may include a speaker region 190. The speaker region 190 may include a speaker 192 (see also FIG. 1A) at least partially mounted in the housing 152. In some embodiments, and similar to the relative positioning of the speaker 122 and the directional microphone 116 of the base 102 of FIGS. 1B and 1C, the speaker 192 disclosed in FIG. 1D may be mounted in a position in the housing 152 that is offset from the directional microphone 164 such that the speaker 192 is positioned in a null of the directional microphone 164. Further the hollow cavity 158 may be oriented in a direction that is offset by an angle from an acoustic radiation direction of the speaker 192, similar to the offset disclosed in FIG. 1C. Either or both of these offsets may reduce or eliminate acoustic waves emanating from the speaker 192 from entering either port of the directional microphone 164 and thereby reduce or eliminate acoustic echo. Further, in these and other embodiments, the bi-directional configuration of the hollow cavity 158 and the directional microphone 164 may reduce or eliminate background noise during a telephone conversation or other communication session as compared to an omnidirectional configuration, for example.

In addition, in some embodiments, as disclosed in FIGS. 1D and 1E, the rear surface 156 of the housing 152 may include fins 170. The fins 170 may have a length 194 configured to prevent a hand holding the handset 150 from blocking acoustic waves from entering the rear opening 162 of the hollow cavity 158. For example, this may be accomplished by making the length 194 of the fins 170 wider than the average width of an adult human hand. The fins 170 may also create an open cavity 196 that is less likely to reverberate from the mechanical energy of the speaker 192. Instead of the fins 170, it is understood that other structures may be employed to accomplish a similar or identical result, such as a mesh or matrix of holes for example.

Modifications, additions, or omissions may be made to the telephone 100 without departing from the scope of the present disclosure. For example, in some embodiments, the telephone 100 may not include the speaker 122 and/or the hollow cavity 110. Alternatively or additionally, the telephone 100 may not include the handset 150. As another example, the description regarding the configuration and the placement of the speaker 122 and the hollow cavity 110 may be applied to other electronic devices to reduce or eliminate background noise during communication sessions involving the electronic devices.

Figure 2B:
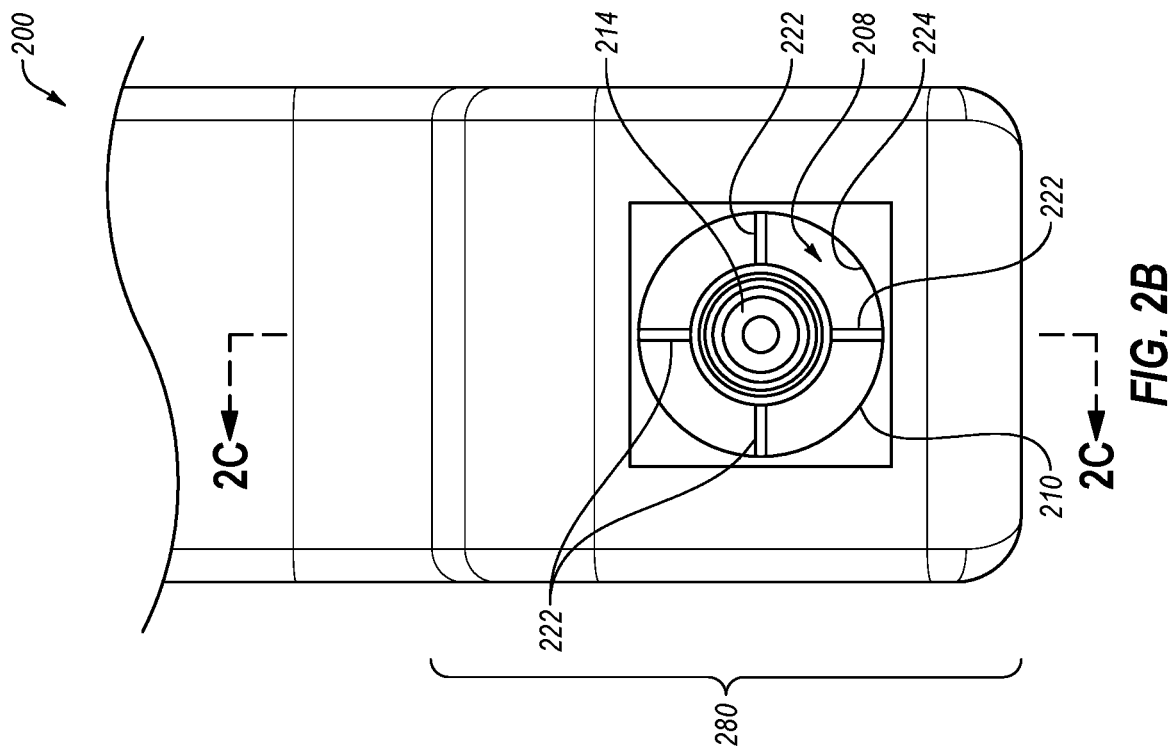
FIG. 2B illustrates a front view of the microphone region of the second example handset of FIG. 2A with the mesh of FIG. 2A removed to expose a directional microphone.
Figure 2A:
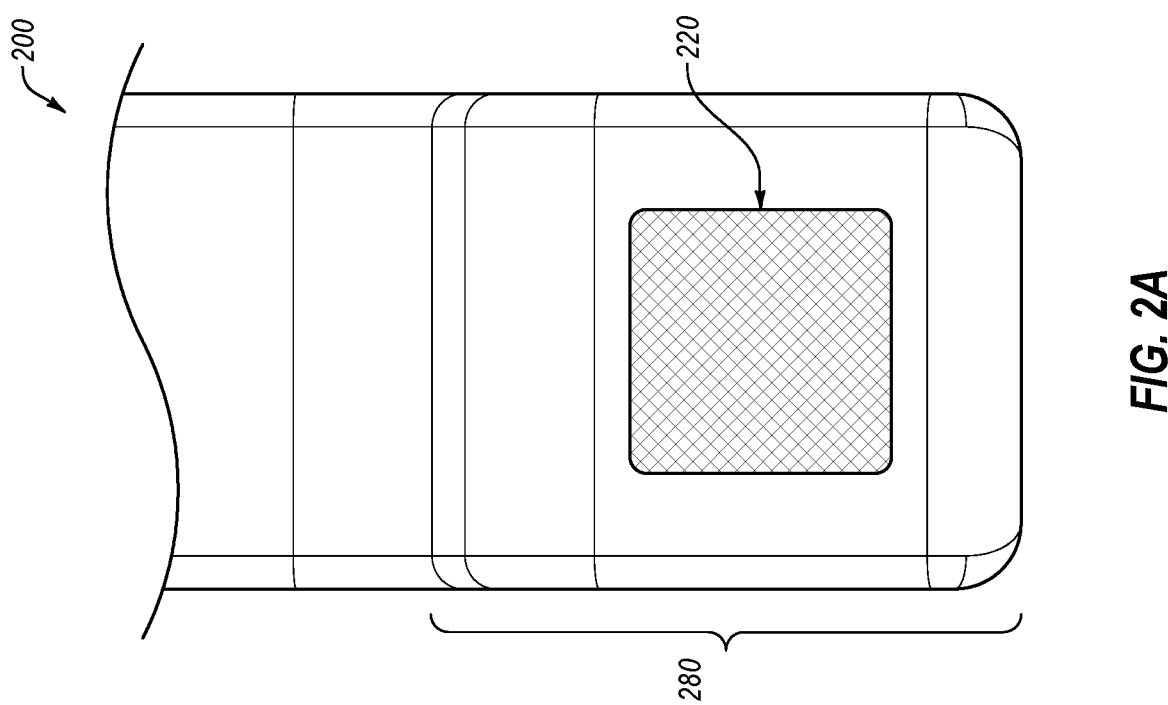
FIG. 2A illustrates a front view of a microphone region of a second example handset with a mesh.
Figure 2C:
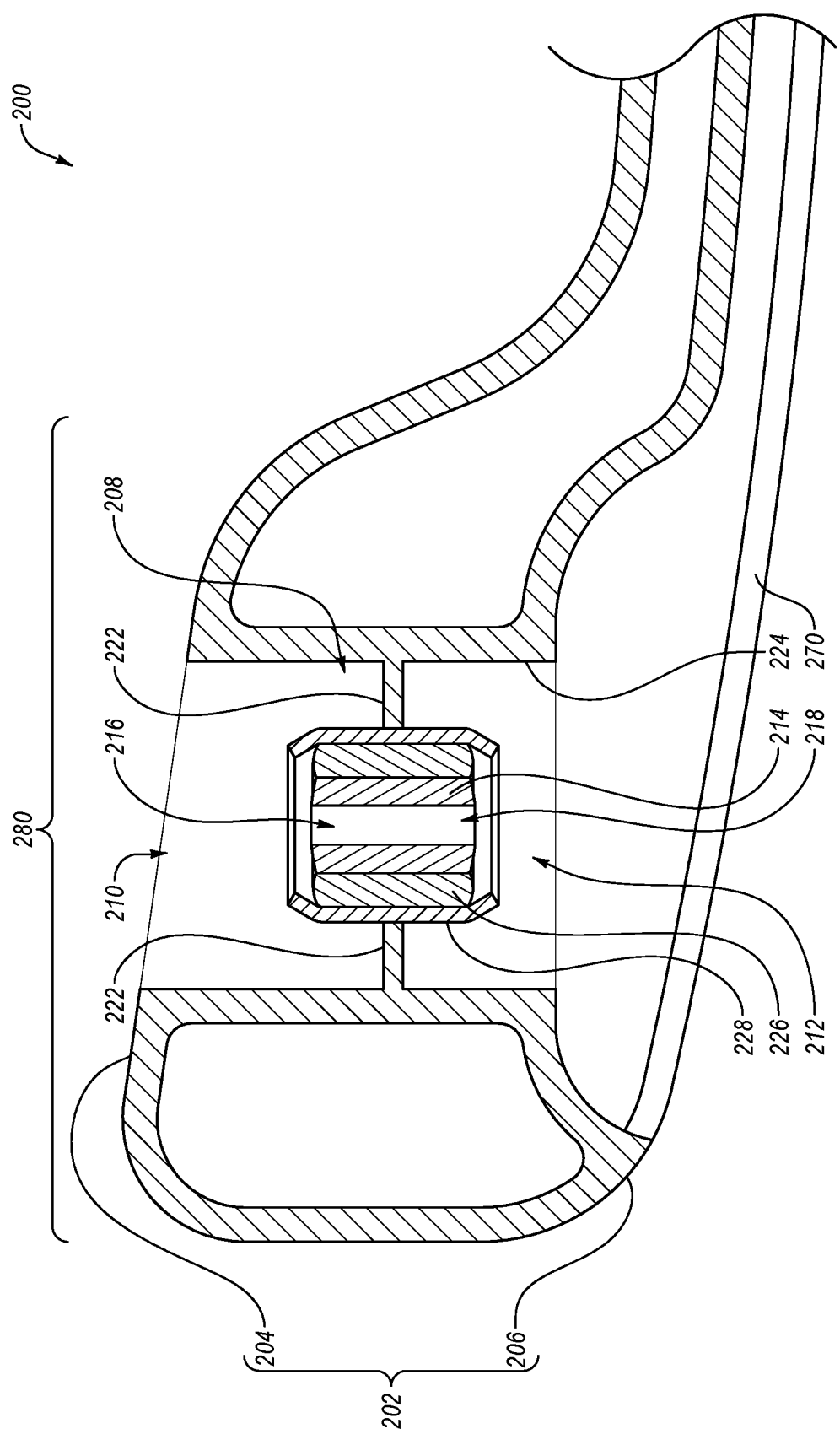
FIG. 2C illustrates a cross-sectional side view of the microphone region of the second example handset of FIG. 2A.

FIG. 2A illustrates a front view of a microphone region 280 of an example handset 200 with a mesh 220. FIG. 2B illustrates a front view of the microphone region 280 of the handset 200 of FIG. 2A with the mesh 220 of FIG. 2A removed to expose a directional microphone 214. FIG. 2C illustrates a cross-sectional side view of the microphone region 280 of the handset 200 of FIG. 2A. The handset 200 may be an electronic device arranged in accordance with at least one embodiment described in the present disclosure.

As disclosed in FIGS. 2A-2C, the handset 200 may include a housing 202 that includes a front surface 204, a rear surface 206 positioned opposite the front surface 204, and a hollow cavity 208 positioned between the front surface 204 and the rear surface 206. The housing 202 may be formed from molded plastic, for example. The hollow cavity 208 may include a front opening 210 defined in the front surface 204 and a rear opening 212 defined in the rear surface 206. A directional microphone 214 may be mounted in the hollow cavity 208. The directional microphone 214 may include a front port 216 and a rear port 218. The directional microphone 214 may be mounted in the hollow cavity 208 of the housing 202 with the front port 216 oriented toward the front opening 210 and with the rear port 218 oriented toward the rear opening 212. The front opening 210 and the rear opening 212 may allow acoustic waves to enter the hollow cavity 208 in order to enter the front port 216 and the rear port 218, respectively, of the directional microphone 214.

As disclosed in FIGS. 2A-2C, the handset 200 may be configured to reduce or eliminate acoustic echo during a telephone conversation or other communication session. For example, in addition to the microphone region 280, the handset 200 may include a speaker region (not shown) similar to the speaker region 190 of the handset 150 of FIG. 1D, and the speaker of the speaker region of the handset 200 may be mounted in a position in the housing 202 that is offset from the directional microphone 214 such that the speaker is positioned in a null of the directional microphone 214. Further the hollow cavity 208 may be oriented in a direction that is offset by an angle from an acoustic radiation direction of the speaker, similar to the offset disclosed in FIG. 1C. Either or both of these offsets may reduce or eliminate acoustic waves emanating from the speaker from entering either port of the directional microphone 214 and thereby reduce or eliminate acoustic echo. Further, the bi-directional configuration of the hollow cavity 208 and the directional microphone 214 may reduce or eliminate background noise during a telephone conversation or other communication session as compared to an omnidirectional configuration, for example.

In addition, as disclosed in FIG. 2C, the rear surface 206 of the housing 202 may include fins 270 configured similarly to the fins 170 of FIGS. 1D and 1E. Instead of the fins 270, it is understood that other structures may be employed to accomplish similar or identical results, such as a mesh or matrix of holes for example. Further, as disclosed in FIGS. 2A and 2B, the front opening 210 of the hollow cavity 208 may be covered in a mesh 220. Instead of the mesh 220, it is understood that other structures may be employed to accomplish a similar or identical result, such as fins or a matrix of holes for example.

Further, as disclosed in FIGS. 2B and 2C, the directional microphone 214 may be suspended in the hollow cavity 208 of the housing 202 using one or more spokes 222 to attach the directional microphone 214 to the wall 224 of the hollow cavity 208. The spokes 222 may be formed from molded plastic, for example. It is noted that in embodiments where the hollow cavity 208 is a cylindrical hollow cavity, the wall 224 of the hollow cavity 208 may include a single cylindrical wall. In these and other embodiments, the wall 223 of the hollow cavity 208 may be the only wall of the hollow cavity 208. However, in embodiments where the hollow cavity is a shape other than cylindrical, the hollow cavity may have multiple walls. The suspension of the directional microphone 214 in the hollow cavity 208 using the spokes 222 may allow acoustic waves to enter the hollow cavity 208 and pass unimpeded to the front port 216 and the rear port 218 of the directional microphone 214 to provide a free-field directional response in the directional microphone 214. A length of the one or more spokes 222 may cause an open gap between the directional microphone 214 and the wall 224 to be greater than the diameter of the directional microphone 214, which is accomplished by the length of each of the spokes 222 being greater than the diameter of the directional microphone 214. The open gap between the directional microphone 214 and the wall 224 being greater than the diameter of the directional microphone 214 may improve the free-field directional response in the directional microphone 214.

In some embodiments, the directional microphone 214 may be surrounded by a dampening material 226, such as a rubber dampening material for example, which may isolate the directional microphone 214 from the spokes 222 and from the wall 224 of the hollow cavity 208. Isolating the directional microphone 214 from the spokes 222 and from the wall 224 may reduce the mechanical coupling between the directional microphone 214 and the speaker of the handset 200. Reduction of the mechanical coupling may reduce the occurrence of acoustic waves traveling through the housing 202 being picked up by the directional microphone 214. In some embodiments, the spokes 222 may be attached to the dampening material 226 using a bracket 228 or other structure, for example.

Modifications, additions, or omissions may be made to the handset 200 without departing from the scope of the present disclosure. For example, in some embodiments, the hollow cavity 208 and the directional microphone 214 may be incorporated into other electronic devices besides the handset 200. For example, a tablet, cellular phone, smart phone, or other electronic device may be implemented with the hollow cavity 208 and the directional microphone 214.

Figure 3A:
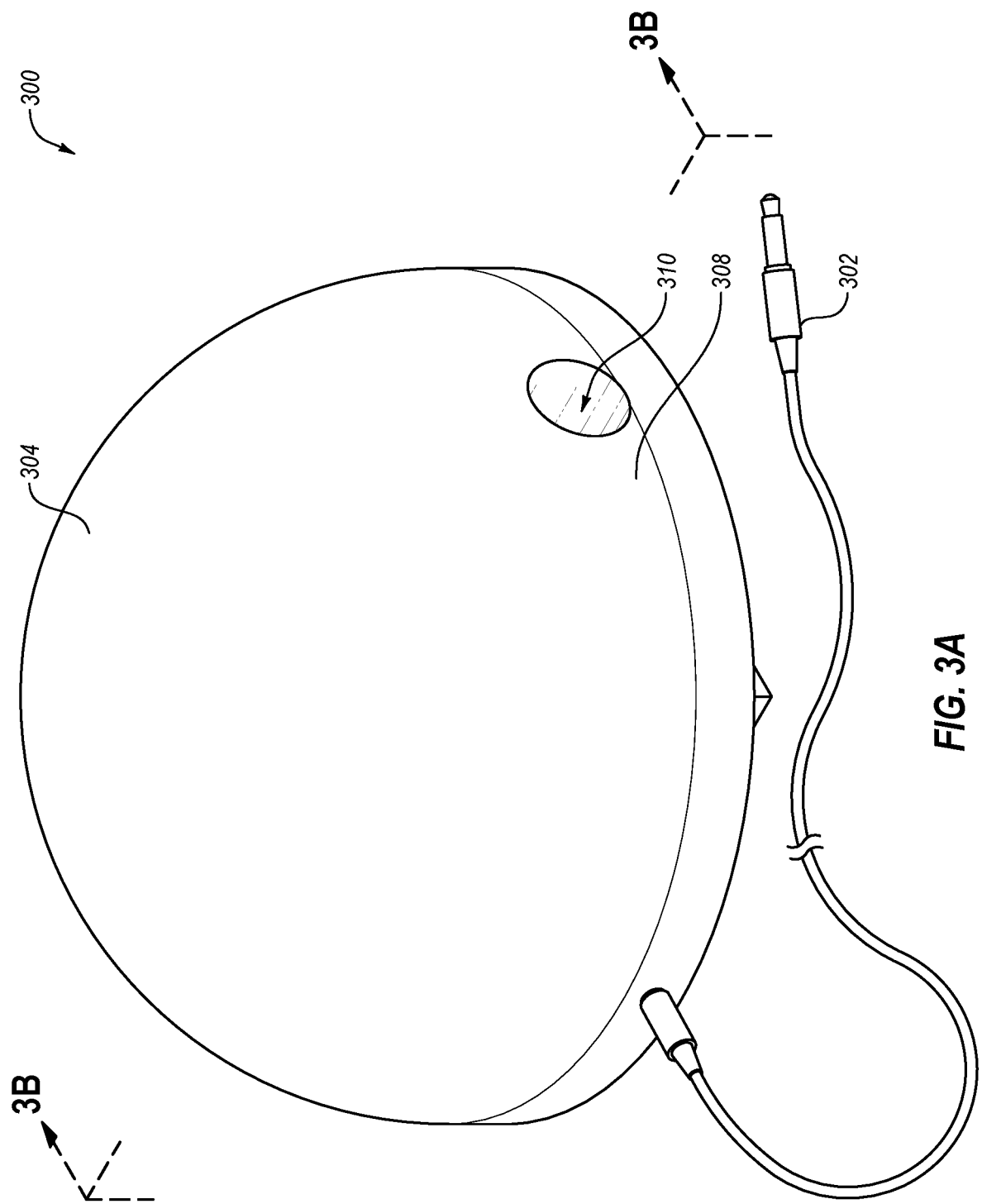
FIG. 3A illustrates a front perspective view of a first example remote microphone.
Figure 3B:
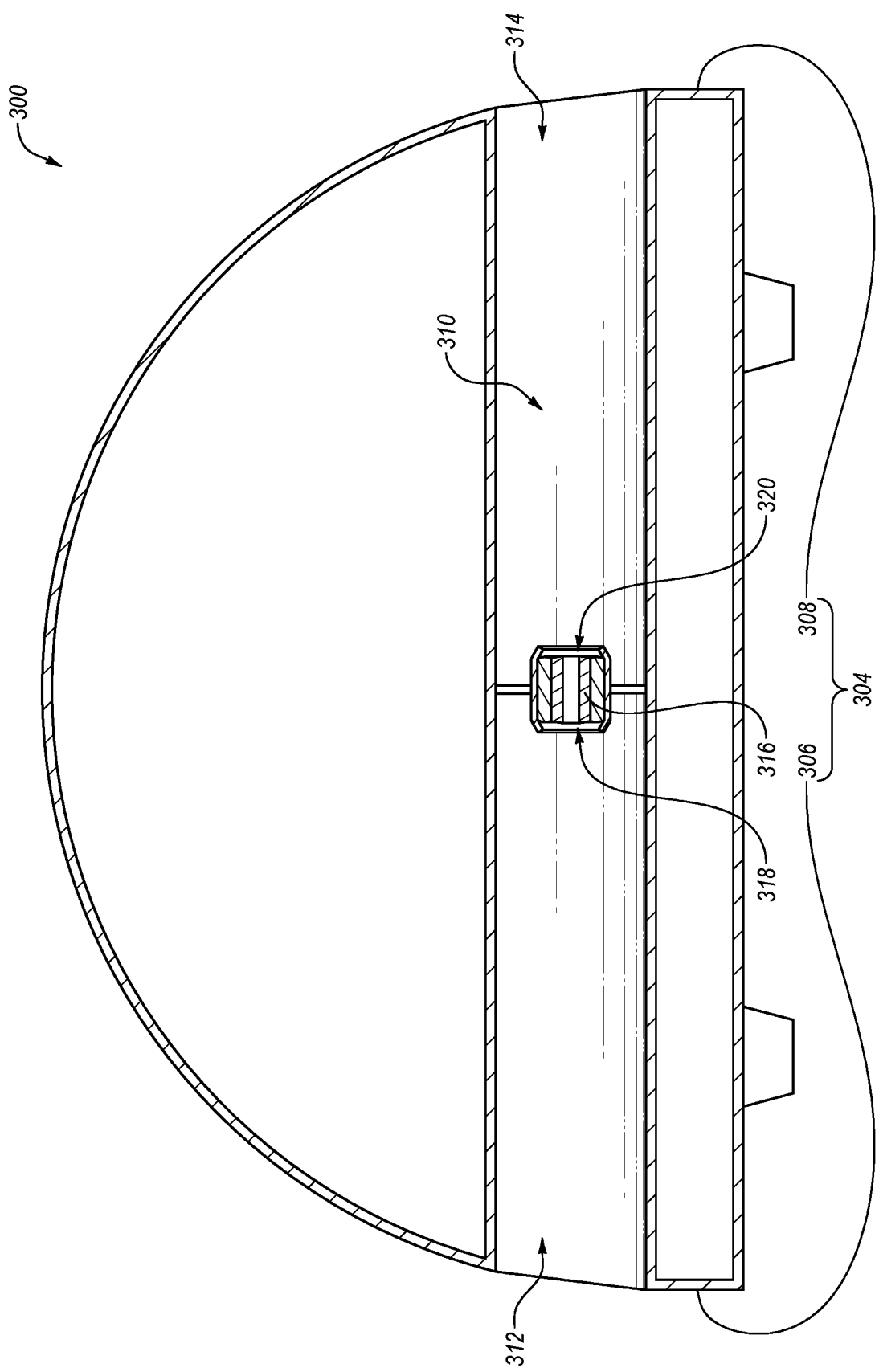
FIG. 3B illustrates a cross-sectional side view of the first example remote microphone of FIG. 3A.

FIG. 3A illustrates a front perspective view of an example remote microphone 300. FIG. 3B illustrates a cross-sectional side view of the remote microphone 300 of FIG. 3A. The remote microphone 300 may be an electronic device arranged in accordance with at least one embodiment described in the present disclosure.

The remote microphone 300 of FIG. 3A may be employed in connection with a speakerphone, such as the base 102 of FIG. 1A, as the microphone portion of the speakerphone. For example, a user of the base 102 of FIG. 1A may participate in a telephone conversation or other communication session using the remote microphone 300 by plugging the plug 302 of the remote microphone 300 into an audio port 198 of the base 102, thereby connecting the remote microphone 300 to the telephone 100 via a wired connection. It is understood that this wired connection may be replaced by a wireless connection between the remote microphone 300 and the base 102, such as a Bluetooth wireless connection. Alternatively or additionally, the remote microphone 300 may be used with another communication device to allow a user to participate in a communication session.

As disclosed in FIGS. 3A and 3B, the remote microphone 300 may include a housing 304 that includes a front surface 306, a rear surface 308 positioned opposite the front surface 306, and a hollow cavity 310 positioned between the front surface 306 and the rear surface 308. The housing 304 may be formed from molded plastic, for example. The hollow cavity 310 may include a front opening 312 defined in the front surface 306 and a rear opening 314 defined in the rear surface 308. In some embodiments, the hollow cavity 310 may be a cylindrical hollow cavity. In other embodiments, the hollow cavity 310 may have other shapes such as rectangular, among other shapes.

Also disclosed in FIG. 3B, the remote microphone 300 may further include a directional microphone 316 mounted in the hollow cavity 310. The directional microphone 316 may include a front port 318 and a rear port 320. The directional microphone 316 may be mounted in the hollow cavity 310 of the housing 304 with the front port 318 oriented toward the front opening 312 and with the rear port 320 oriented toward the rear opening 314. The front opening 312 and the rear opening 314 may allow acoustic waves to enter the hollow cavity 310 in order to enter the front port 318 and the rear port 320, respectively, of the directional microphone 316.

However, as disclosed in FIG. 3B, the hollow cavity 310 and the directional microphone 316 may be configured to reduce or eliminate acoustic echo during a telephone conversation or other communication session. For example, when employed with the base 102 of FIG. 1A, the directional microphone 316 may be positioned such that the speaker 122 of the base 102 is in a null of the directional microphone 316, which may reduce or eliminate acoustic waves emanating from the speaker 122 from entering either port of the directional microphone 316 and thereby reduce or eliminate acoustic echo. Further, the bi-directional configuration of the hollow cavity 310 and the directional microphone 316 may reduce or eliminate background noise during a telephone conversation or other communication session as compared to an omnidirectional configuration, for example.

Figure 4:
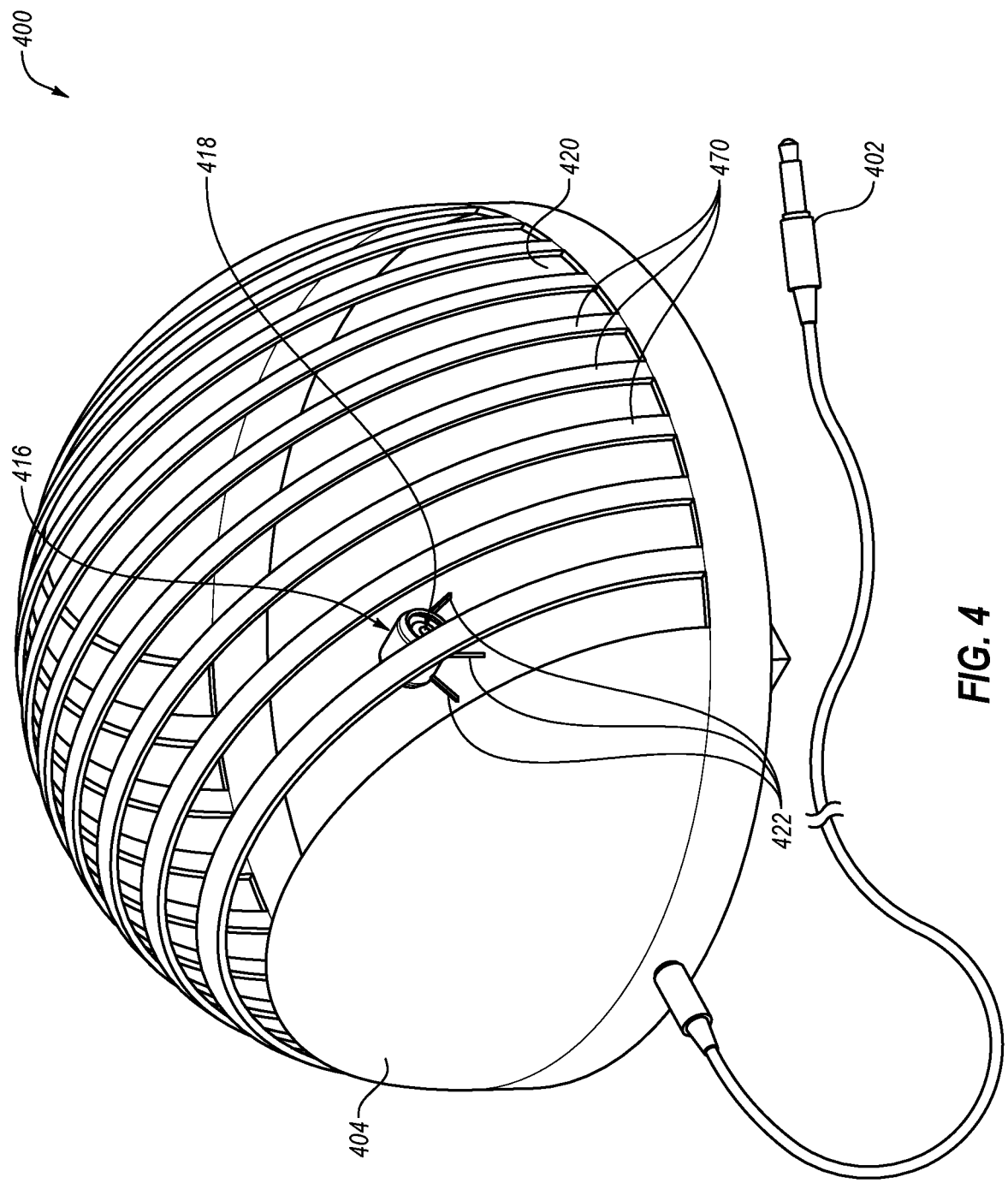
FIG. 4 illustrates a front perspective view of a second example remote microphone.

FIG. 4 illustrates a front perspective view of an example remote microphone 400. The remote microphone 400 may be an electronic device arranged in accordance with at least one embodiment described in the present disclosure.

The remote microphone 400 may be employed in connection with a speakerphone, such as the base 102 of FIG. 1A, as the microphone portion of the speakerphone. For example, a user of the base 102 of FIG. 1A may participate in a telephone conversation or other communication session using the remote microphone 400 by plugging the corded plug 402 of the remote microphone 400 into the audio port 198 of the base 102.

As disclosed in FIG. 4, the remote microphone 400 may include a housing 404 that includes fins 470. The housing may be formed from molded plastic, for example. The fins 470 may have a length configured to prevent a hand holding the remote microphone 400 from blocking acoustic waves from passing through the fins 470. Instead of the fins 470, it is understood that other structures may be employed to accomplish a similar or identical result, such as a mesh or matrix of holes for example.

Also disclosed in FIG. 4, the remote microphone 400 may further include a directional microphone 416 mounted within the housing 404 underneath the fins 470. The directional microphone 416 may include a front port 418 and a rear port (not shown). The directional microphone 416 may be suspended above a base 420 using one or more supports 422. The suspension of the directional microphone 416 using the supports 422 may allow acoustic waves to enter the open cavity under the fins 470 and pass unimpeded to the front port 418 and the rear port (not shown) of the directional microphone 416 to provide a free-field directional response in the directional microphone 416. The directional microphone 416 may be configured to reduce or eliminate acoustic echo during a telephone conversation or other communication session. For example, when employed with the base 102 of FIG. 1A, the directional microphone 416 may be positioned such that the speaker 122 of the base 102 is in a null of the directional microphone 416, which may reduce or eliminate acoustic waves emanating from the speaker 122 from entering either port of the directional microphone 416 and thereby reduce or eliminate acoustic echo. Further, the bi-directional configuration of the directional microphone 416 may reduce or eliminate background noise during a telephone conversation or other communication session as compared to an omnidirectional configuration, for example.

It is understood that any of the features of the various electronic devices disclosed herein may be rearranged within the electronic devices, eliminated from the electronic devices, or added to other electronic devices. For example, the dampening material surrounding the directional microphone 214, as disclosed in FIG. 2B, may be employed with any of the other directional microphones disclosed herein. For example, the directional microphone 164 disclosed in FIG. 1E may be isolated from a wall of the hollow cavity 158 by a dampening material. Further, the one or more spokes 222 suspending the directional microphone 214 as disclosed in FIG. 2B may be employed with any of the other directional microphones disclosed herein. Also, the mesh 220 of FIG. 2A covering the front opening 210 of the hollow cavity 208 of FIG. 2B, or another similar structure, may be employed to cover any of the hollow cavity openings disclosed herein.

Figure 5:
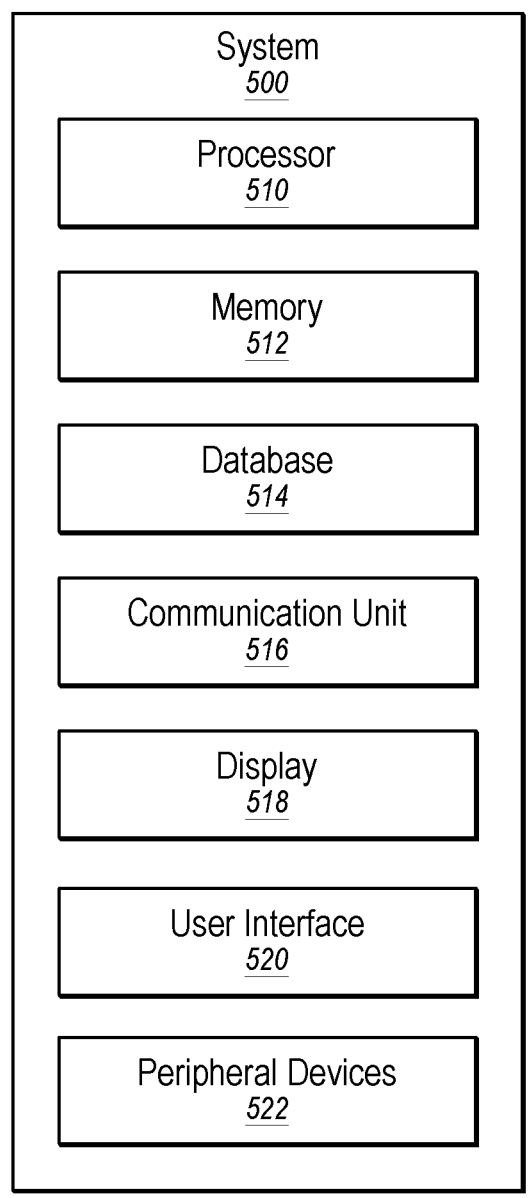
FIG. 5 illustrates an example computing system.

FIG. 5 illustrates an example system 500 that may be arranged in accordance with at least one embodiment described in the present disclosure. The system 500 may include a processor 510, a memory 512, a database 514, a communication unit 516, a display 518, a user interface unit 520, and peripheral devices 522, which all may be communicatively coupled. In some embodiments, the system 500 may be part of any of the electronic devices described in this disclosure. For example, the system 500 may be part of the telephone 100 of FIG. 1A or the remote microphone 300 of FIGS. 3A and 3B.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 5, it is understood that the processor 510 may include any number of processors distributed across any number of networks or physical locations that are configured to perform individually or collectively any number of operations described herein. In some embodiments, the processor 510 may interpret and/or execute program instructions and/or process data stored in the memory 512, the database 514, or the memory 512 and the database 514. In some embodiments, the processor 510 may fetch program instructions from the database 514 and load the program instructions into the memory 512.

After the program instructions are loaded into the memory 512, the processor 510 may execute the program instructions. For example, the system 500 may be part of the telephone 100 of FIG. 1A. In these and other embodiments, the instructions may include the processor 510 assisting in the performance of captioning during a telephone conversation or other communication session.

The memory 512 and the database 514 may include computer-readable storage media for carrying or having computer-executable instructions or data structures stored thereon. Such computer-readable storage media may be any available media that may be accessed by a general-purpose or special-purpose computer, such as the processor 510. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 516 may include any component, device, system, or combination thereof that is configured to transmit or receive information over a network. In some embodiments, the communication unit 516 may communicate with other devices at other locations, the same location, or even other components within the same system. For example, the communication unit 516 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 516 may permit data to be exchanged with a network and/or any other devices or systems described in the present disclosure.

The display 518 may be configured as one or more displays, like an LCD, LED, or other type display. The display 518 may be configured to present video, text captions, user interfaces, and other data as directed by the processor 510.

The user interface unit 520 may include any device that allows a user to interface with the system 500. For example, the user interface unit 520 may include a mouse, a track pad, a keyboard, a touchscreen, a telephone switch hook, and/or a telephone keypad, among other devices. The user interface unit 520 may receive input from a user and provide the input to the processor 510.

The peripheral devices 522 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 500 or otherwise generated by the system 500.

Modifications, additions, or omissions may be made to the system 500 without departing from the scope of the present disclosure.

Figure 6:
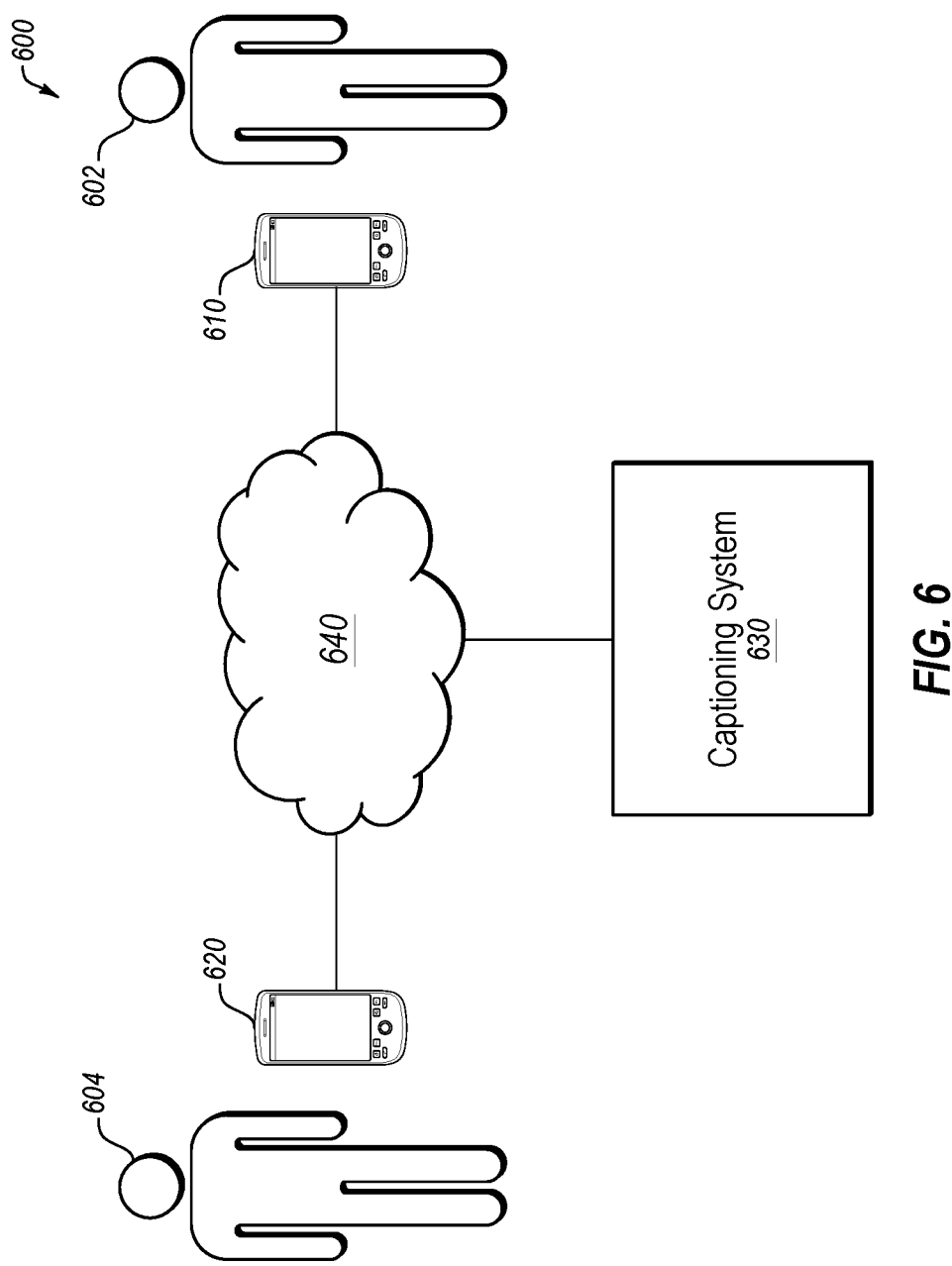
FIG. 6 illustrates an example communication system that may include an electronic device that includes a directional microphone.

FIG. 6 illustrates an example communication system 600 that may include an electronic device that includes a directional microphone. The communication system 600 may be arranged in accordance with at least one embodiment described in the present disclosure. The communication system 600 may include a first device 610, a second device 620, and a captioning system 630. The first device 610 and the captioning system 630 may be communicatively coupled by a network 640. Alternately or additionally, the first device 610 and the second device 620 may be communicatively coupled by the network 640. In some embodiments, the network 640 may be any network or configuration of networks configured to send and receive communications between systems and devices. In some embodiments, the network 640 may include a conventional type network, a wired or wireless network, and may have numerous different configurations. In some embodiments, the network 640 may also be coupled to or may include portions of a telecommunications network, including telephone lines, for sending data in a variety of different communication protocols, such as a plain old telephone system (POTS).

In some embodiments, the communication system 600 illustrated may be configured to facilitate an assisted call between a hearing-impaired user 602 and a second user 604. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, a communication session may be established between the first device 610 and the second device 620. In one example embodiment, the first device 610 or the second device 620 may be the telephone 100 of FIG. 1A, and the directional microphones disclosed in connection with the telephone 100 may be employed during the communication session. In these and other embodiments, the communication session may be a captioning communication session.

The captioning system 630 may be an assistive service, which is intended to permit a hearing-impaired person to utilize a communication network and assist their understanding of a conversation by providing text captions to supplement voice conversation occurring during communication sessions with other devices, such as the second device 620.

During a captioning communication session, the captioning system 630 and the first device 610 maybe be communicatively coupled using networking protocols. In some embodiments, during the communication session between the first device 610 and the second device 620, the first device 610 may provide the audio signal from the second device 620 to the captioning system 630.

At the captioning system 630, a call assistant may listen to the audio signal of the second user 604 and "revoice" the words of the second user 604 to a speech recognition computer program tuned to the voice of the call assistant. In these and other embodiments, the call assistant may be an operator who serves as a human intermediary between the hearing-impaired user 602 and the second user 604. In some embodiments, text captions may be generated by the speech recognition computer as a transcription of the audio signal of the second user 604. The text captions may be provided to the first device 610 being used by the hearing-impaired user 602 over the network 640. The first device 610 may display the text captions while the hearing-impaired user 602 carries on a normal conversation with the second user 604. The text captions may allow the hearing-impaired user 602 to supplement the voice signal received from the second device 620 and confirm his or her understanding of the words spoken by the second user 604.

Modifications, additions, or omissions may be made to the communication system 600 without departing from the scope of the present disclosure. For example, in some embodiments, the second user 604 may be hearing impaired. In these and other embodiments, the captioning system 630 may provide text captions to the second device 620 based on audio data transmitted by the first device 610. Alternately or additionally, the captioning system 630 may include additional functionality. For example, the captioning system 630 may edit the text captions or make other alterations to the text captions after presentation of the text captions on the first device 610.

As indicated above, the embodiments described herein may include the use of a special purpose or general purpose computer (e.g., the processor 510 of FIG. 5) including various computer hardware or software modules, as discussed in greater detail below. Further, as indicated above, embodiments described herein may be implemented using computer-readable media (e.g., the memory 512 or database 514 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An electronic device comprising:
   a housing including a front surface, a rear surface positioned opposite the front surface, and a hollow cavity positioned between the front surface and the rear surface, the hollow cavity including a front opening defined in the front surface, a rear opening defined in the rear surface, and a cavity surface that extends between the front opening and the rear opening and defines a body of the hollow cavity; and a directional microphone including a front port, a rear port, and an outer surface that extends between the front port and the rear port and defining a maximum diameter in a first plane that includes opposite sides of the outer surface and that is perpendicular to a second plane that includes the front port and the rear port, wherein
  the directional microphone is suspended in the hollow cavity of the housing using at least two spokes to attach the directional microphone to the cavity surface of the hollow cavity with the front port oriented toward the front opening and with the rear port oriented toward the rear opening, and
  lengths of each of the at least two spokes are larger than the maximum diameter of the directional microphone and cause an open gap between the outer surface of the directional microphone and the cavity surface such that a minimum distance of the open gap between any point on the outer surface of the directional microphone and any point on the cavity surface is greater than the maximum diameter of the directional microphone.

2. The electronic device of claim 1, wherein the electronic device is a telephone base that further includes a speaker that is at least partially mounted in the housing.

3. The electronic device of claim 2, wherein the speaker is at least partially mounted in the housing in a null of the directional microphone.

4. The electronic device of claim 2, wherein the speaker includes an acoustic radiation direction and the hollow cavity is oriented in a direction that is offset by an angle from the acoustic radiation direction of the speaker, wherein the angle is between 10 degrees and 50 degrees.

5. The electronic device of claim 1, wherein the electronic device is a remote microphone configured to connect to a communication device or a telephone handset that further includes a speaker at least partially mounted in the housing.

6. The electronic device of claim 1, wherein the cavity surface has a substantially straight cylindrical shape.

7. The electronic device of claim 1, wherein the directional microphone is contained completely within the hollow cavity such that no portion of the directional microphone extends out of the hollow cavity, and a diameter of the front opening of the hollow cavity is larger than the diameter of the directional microphone and a diameter of the rear opening of the hollow cavity is larger than the diameter of the directional microphone.

8. An electronic device comprising:
  a housing including a front surface, a rear surface positioned opposite the front surface, and a hollow cavity positioned between the front surface and the rear surface, the hollow cavity including a front opening defined in the front surface and a rear opening defined in the rear surface; and
  a directional microphone including a front port and a rear port and defining a diameter in a first plane perpendicular to a second plane that includes the front port and the rear port, the directional microphone mounted in the hollow cavity of the housing with the front port oriented toward the front opening and with the rear port oriented toward the rear opening, the directional microphone being contained completely within the hollow cavity such that no portion of the directional microphone extends out of the hollow cavity, a diameter of the front opening of the hollow cavity is larger than the diameter of the directional microphone, and a diameter of the rear opening of the hollow cavity is larger than the diameter of the directional microphone.

9. The electronic device of claim 8, wherein the directional microphone is mounted in the hollow cavity using one or more spokes that attach to one or more walls of the hollow cavity such that the directional microphone is suspended in the hollow cavity of the housing by the one or more spokes.

10. The electronic device of claim 8, wherein the front opening and the rear opening of the hollow cavity are substantially aligned such that a straight line passes through the front opening and the rear opening.

11. The electronic device of claim 8, wherein the hollow cavity has a shape that is cylindrical, rectangular, oval, pentagonal, or hexagonal.

12. The electronic device of claim 8, further comprising a speaker that is at least partially mounted in the housing.

13. The electronic device of claim 12, wherein the speaker is at least partially mounted in the housing in a null of the directional microphone.

14. The electronic device of claim 12, wherein the speaker includes an acoustic radiation direction and the hollow cavity is oriented in a direction that is offset by an angle from the acoustic radiation direction of the speaker, wherein the angle is between 10 degrees and 50 degrees.

15. The electronic device of claim 8, wherein the electronic device includes a telephone base that further comprises a speaker at least partially mounted in the housing.

16. A device comprising:
  a housing including a front surface, a rear surface positioned opposite the front surface, and a hollow cavity positioned between the front surface and the rear surface, the hollow cavity including a front opening defined in the front surface and a rear opening defined in the rear surface; and
  a directional microphone including a front port and a rear port and defining a diameter in a first plane perpendicular to a second plane that includes the front port and the rear port, the directional microphone mounted in the hollow cavity of the housing using one or more spokes to attach the directional microphone to one or more walls of the hollow cavity with the front port oriented toward the front opening and with the rear port oriented toward the rear opening, and a diameter of the front opening of the hollow cavity is larger than the diameter of the directional microphone and a diameter of the rear opening of the hollow cavity is larger than the diameter of the directional microphone.

17. The device of claim 16, wherein the front opening and the rear opening of the hollow cavity are substantially aligned such that a straight line passes through the front opening and the rear opening.

18. The device of claim 16, further comprising a speaker mounted in the housing, wherein the speaker is at least partially mounted in the housing in a null of the directional microphone.

19. The device of claim 18, wherein the speaker includes an acoustic radiation direction and the hollow cavity is oriented in a direction so that a straight line passing through the front opening and the rear opening is offset by an angle from the acoustic radiation direction of the speaker, wherein the angle is between 10 degrees and 50 degrees.

20. The device of claim 16, wherein the directional microphone is contained completely within the hollow cavity such that no portion of the directional microphone extends out of the hollow cavity.

* * * * *